Nov. 9, 1937.   F. M. MILLER   2,098,667

DRIP POINT GRID TILE

Filed Nov. 27, 1936

WITNESS:
Rob R Kitchel

INVENTOR
Fred M. Miller
B
Augustus B Stoughton
ATTORNEY

Patented Nov. 9, 1937

2,098,667

UNITED STATES PATENT OFFICE 2,098,667

DRIP POINT GRID TILE

Fred M. Miller, Bala-Cynwyd, Pa.

Application November 27, 1936, Serial No. 112,881

4 Claims. (Cl. 261—94)

In many engineering and chemical applications, there are involved processes in which gases and liquids are contacted generally by maintaining an upward flow of gas and a downward flow of liquid. It is desired to obtain as intimate a mixture of gas and liquid as possible and hence it is desired to avoid the formation of streams or jets of liquid and, on the contrary, to maintain a fog or rain of a huge number of drops or small particles of liquid.

It is an object of my invention to provide a tile or refractory shape having means on a lower horizontal surface for providing a drip or flow of liquid in a number of smaller drops.

More specifically, my novel device consists of a cubical tile having legs or supports projecting from its lower face and having perforations passing vertically therethrough and having a plurality of downwardly projecting pointed projections surrounding the lower ends of said perforations.

For a further exposition of my invention, reference may be had to the annexed drawing and specification, at the end thereof my invention will be specifically pointed out and claimed.

Figure 1:
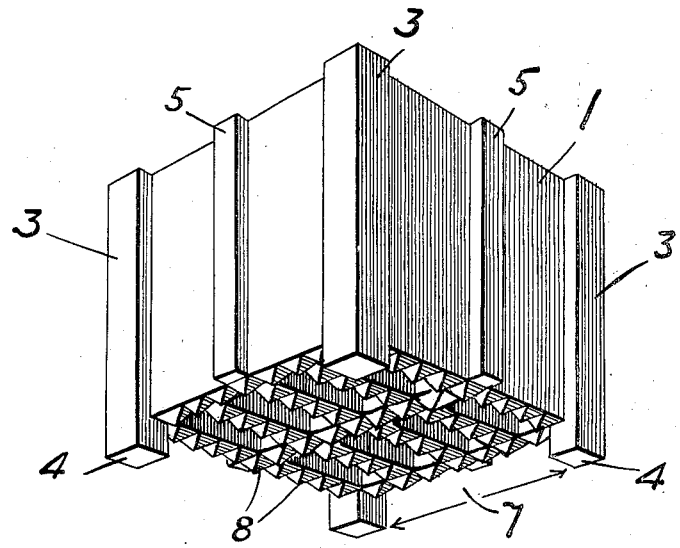
Fig. 1 is a perspective view.

In the drawing, my device is shown as consisting of a tile or refractory shape suitable for use particularly in checker-brick work or the like. The tile may conveniently be made of acid-resisting refractory material which has been de-aired during the process of manufacture of the tile. The tiles are adapted for use at the point of interchange between liquid and gas; for example, in a benzol scrubber.

Figure 2:
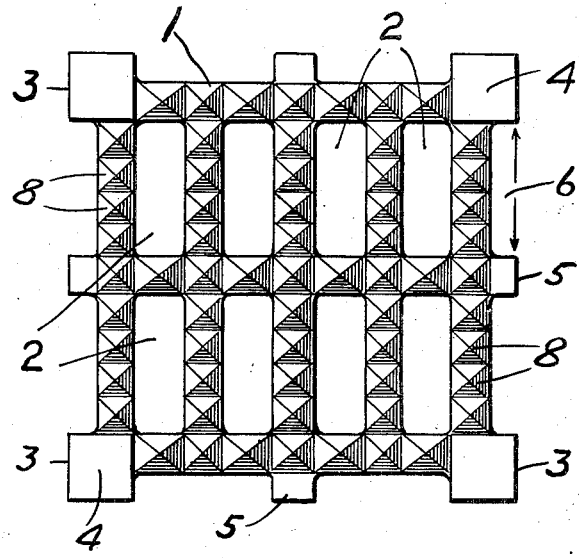
Fig. 2 is a bottom plan view.

The tile itself comprises a substantially cubical body 1 having a plurality of perforations 2 passing vertically therethrough and providing a plurality of channels for the upward flow of gas. At the corners of the tile there are provided columns or reinforcing members 3 which project at their lower ends below or beyond the face of the tile to provide feet or supports 4, which support the lower face of the tile away from the tile or other support on which it is carried. Intermediate members 3 and on the sides of the tile, there may be located smaller reinforcing members 5, which strengthen the tile and at the same time provide, between the tile and the adjacent tiles in a horizontal direction, channels indicated at 6 in Fig. 2. Similarly, the feet or supports 4 provide between them, and above the support for the tile, channels indicated at 7 in Fig. 1.

On the lower face of the tile and surrounding the lower ends of the perforations 2, there are provided a plurality of downwardly pointing or extending pointed projections 8, shown as in the form of pyramids, although any other pointed shape may be used. It will be readily understood that liquid flowing down the walls of the tile, both inside the projections 2 and along the outside walls of the tile, flows down the projections 8 and drops from the points thereof in a series of separated drops, instead of in a sheet or jet of liquid as would be formed from the flat edge of a tile.

Because of the cubical shape of the tile, the tiles may be reversed horizontally, so that the perforations 2 are crosswise of each other, and so that the projections 8 are thus located after the perforations 2 in the tile beneath and serve to baffle or break up the upward flow of gas.

I do not intend to be limited save as the scope of the prior art and of the attached claims may require.

I claim:—

1. A tile having supports extending from its lower face so as to space said lower face above the means supporting the tile, said tile having therein perforations extending vertically through said tile, and downwardly extending pointed projections surrounding the lower ends of said perforations.

2. A substantially cubical tile of refractory material having at its corners reinforcing members projecting from the surface of said tile and extending at their lower ends beyond the face of said tile to provide feet or supports and having vertically extending perforations passing through said tile, and a plurality of downwardly projecting pyramids on the lower face of said tile surrounding the lower ends of said perforations.

3. A substantially cubical tile of acid-resisting refractory material having feet or supports projecting from its lower face and having vertically extending perforations passing therethrough and having on its lower face means for breaking into drops a flow of liquid passing down the walls of the tile.

4. A tile composed of a plurality of vertically extending walls defining vertically extending perforations between them, supports extending downwardly vertically from said walls beneath the lower ends of said perforations, and pointed downwardly extending projecting extensions on the lower ends of said walls adjacent the lower ends of said perforations and above the lower ends of said supports.

FRED M. MILLER.